Aug. 18, 1964  F. J. HANBACK  3,145,035
PIPE COUPLING HAVING A FLEXIBLE SEALING LIP
Filed Sept. 10, 1958  2 Sheets-Sheet 2
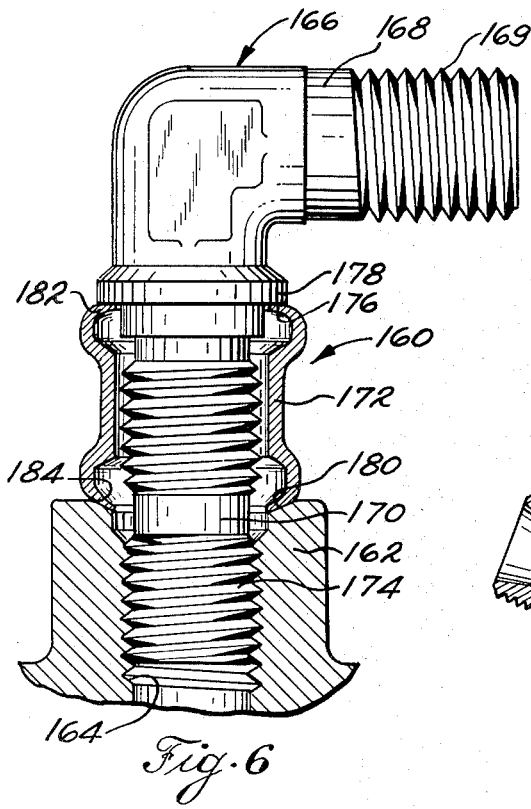
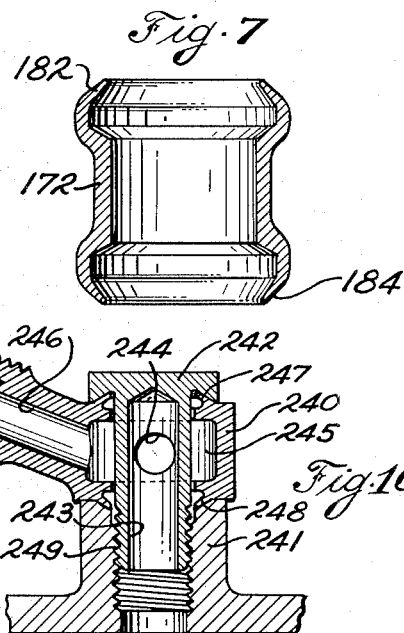
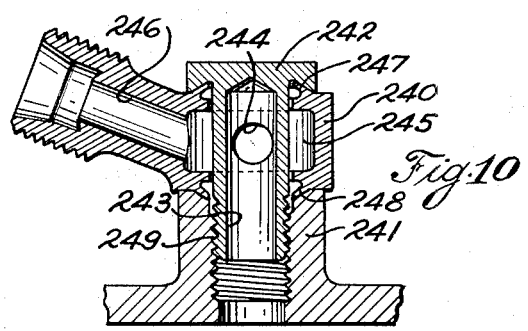
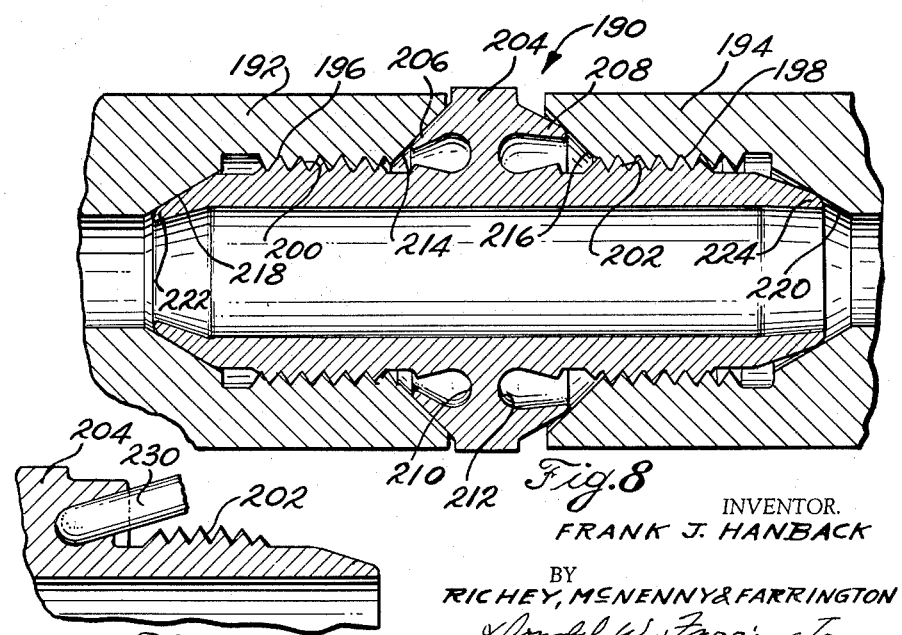
INVENTOR.
FRANK J. HANBACK
BY
RICHEY, McNENNY & FARRINGTON
ATTORNEYS United States Patent Office 3,145,035
Patented Aug. 18, 1964

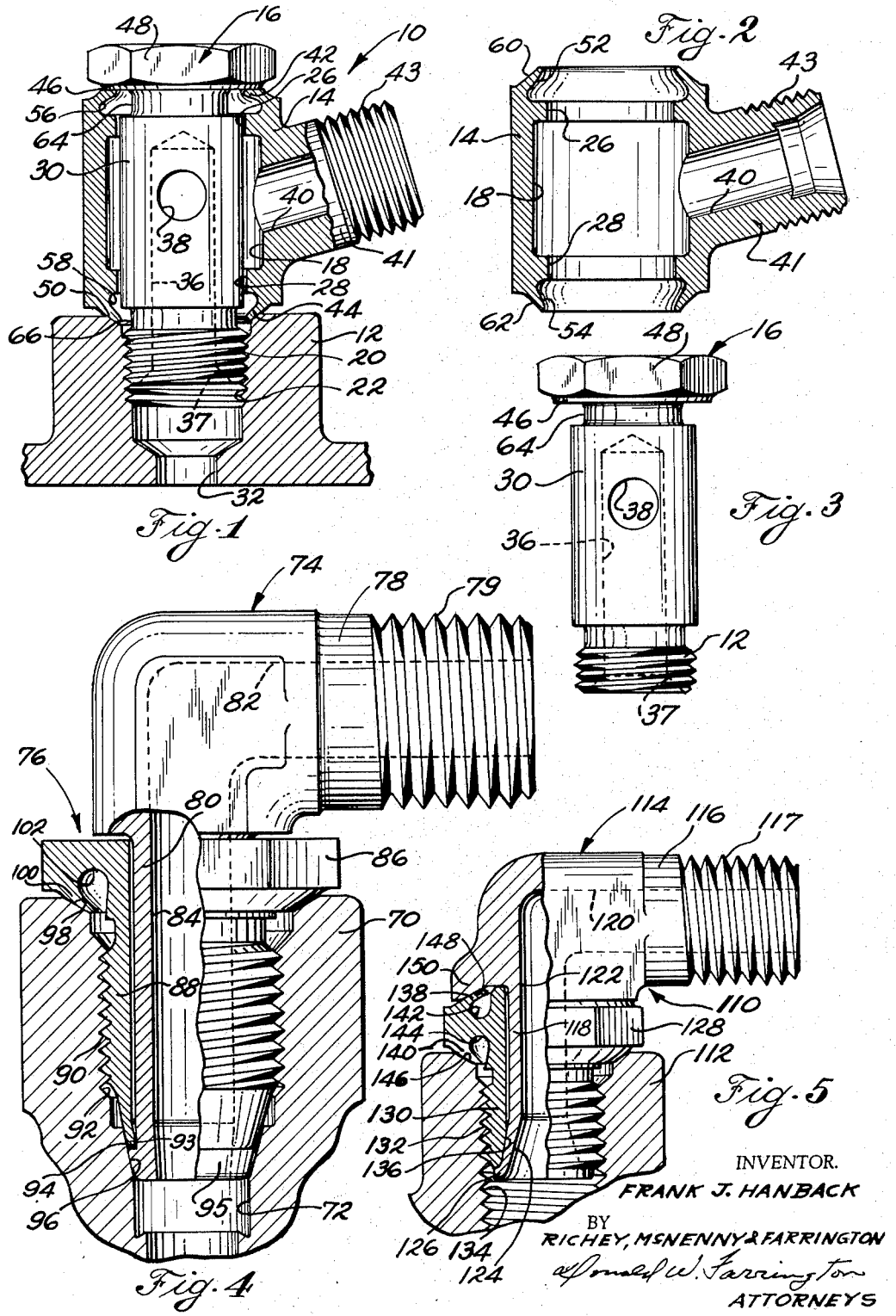

3,145,035
PIPE COUPLING HAVING A FLEXIBLE
SEALING LIP
Frank J. Hanback, Palos Verdes Estates, Calif., assignor to The Weatherhead Company, Cleveland, Ohio, a corporation of Ohio
Filed Sept. 10, 1958, Ser. No. 760,227
2 Claims. (Cl. 285—110)

This invention relates to fluid couplings of the sealed type and more particularly relates to fluid couplings facilitating continuous communication between conduits angularly positionable relative to each other.

It is an object of this invention to maintain established sealed fluid communication between angularly positionable or moving members, through a rigid coupling of the metallic type. Continuous sealed engagement between the rigid members is maintained along pairs of annular engageable surfaces, one of each pair of which may be deformed within its elastic limit to resiliently maintain such sealed engagement. During assembly, the deformable surface is deformed and brought into tight engagement with a complementary surface of the other coupling member and the members are axially secured together whereby the axial position of the coupling members is fixed. Accordingly, the coupling members may be positioned angularly relative to each other while the axial position thereof and, therefore, a fluid tight seal is maintained.

It is another object of this invention to provide a simplified swivel coupling between angularly movable members permitting removal and replacement of components quickly and easily and at a minimum expense.

It is another object of this invention to provide a swivel coupling adaptable for use, disassembly and subsequent re-use without the necessity of replacement of components due to normal usage.

Other and further objects and advantages will become apparent from a perusal of the following detailed description of the invention considered with the accompanying drawings, in which:

FIG. 1 is a partially cross-sectional view in elevation of a preferred embodiment of fluid coupling according to the present invention with parts in an assembled operating condition;

FIG. 2 is an elevational view partially in cross-section of the body member of the coupling of FIG. 1, and showing the position of sealing lips prior to assembly;

FIG. 3 is an elevational view of a bolt member forming a part of the coupling of FIG. 1;

FIG. 4 is an elevational view partially in cross-section, of a modified form of coupling showing parts in an assembled condition;

FIG. 5 is an elevational view partially in cross-section, of another modified form of coupling showing parts in an assembled condition;

FIG. 6 is an elevational view partially in cross-section of another modified form of coupling showing parts in an assembled condition;

FIG. 7 is a detail view in elevation of a collar seal forming a part of the coupling shown in FIG. 6, and showing the sealing lips thereof in position prior to assembly;

FIG. 8 is an elevational view in cross-section of still another embodiment of this invention and showing a symmetrical coupling wherein parts of the right side are shown at an intermediate stage of assembly and parts on the left are shown in an assembled condition;

FIG. 9 is a view illustrating the manner in which the sealing lips of forms of this invention are undercut to facilitate deformation for sealing; and FIG. 10 is an elevation in section showing a modified form of the fitting.

Referring to FIGS. 1–3 of the drawing, 10 represents generally the entire coupling of this embodiment of invention wherein 12 represents a fixed conduit, pipe, vessel or other fixed member with which the coupling 10 has communication. A pivotal body member 14 communicable with a pivotal conduit or other member is retained in axial position relative to the fixed conduit 12 by a bolt 16 passing through the hollow 18 of body member 14 and threaded at its end 20 for engaging the threaded portion of a bore 22 of conduit 12. A pair of annular lands 26 and 28 of diameter slightly larger than the shank 30 of bolt 16 are provided for guiding and maintaining support for the bolt during assembly and operation. Continuous fluid communication through the coupling 10 is established and maintained by a bore 32 in conduit 12 opening into the enlarged threaded bore 22, an axial bore 36 in bolt 16 countersunk at 37, a radial bore 38 extending through the bolt 16 and opening into the bore 36, the hollow 18 of body 14, and a bore 40 extending longitudinally along a nipple 41 protruding generally radially from body 14 and which is connectable as by threads 43 to pivotal member not shown. It is noted that hollow 18 is somewhat larger than bolt 16 whereby fluid may pass through radial bore 38 from axial bore 36 to bore 40 along the enlarged portion of the hollow in any relative angular positions of the coupling parts.

According to a feature of this invention fluid sealing engagement between body member 14 and bolt 16 and between body member 14 and conduit 12 is maintained by engagement between a pair of annular lips 42 and 44 at opposite ends of body member 14, engageable, respectively, with an annular land 46 adjacent to head 48 of bolt 16 and with an annular frusto-conical seat 50 at the end of bore 22 of fixed conduit 12. As illustrated in FIGURE 2 of the drawings, prior to assembly of the coupling, the lips 42 and 44 initially assume positions as shown wherein they protrude away from the inner ends of the hollow of the body member in a frusto-conical form. The lips include inner frusto-conical surfaces 52 and 54 extending in a smooth curve from annular undercut portions 56 and 58 adjacent to lands 26 and 28 and outer frusto-conical surfaces 60 and 62 which extend from the flat ends of the body member and are convergent with respective surfaces 52 and 54. Accordingly, the lips 42 and 44 have a relatively thick base portion near the body 14 and converge outwardly to a relatively narrow portion at the end thereof.

In the preparation of the body member 14, the surfaces 52 and 54 are initially made cylindrical after which the lips are swaged to positions as shown in FIG. 2 of the drawings. In assembling the parts of the coupling, the bolt 16 is threaded down into the conduit 12 bringing the land 46 into line engagement with the lip 42 which brings lip 44 into line engagement with the seat 50. Further tightening of bolt 16 increases the engagement between these parts forcing the land 46 into tighter engagement with the lip 42 and the lip 44 into tighter engagement with the seat 50. The bolt is progressively tightened whereby the lips are progressively deformed under the stress and finally the bolt is tightened with such force that the lip 42 and the lip 44 are deformed sufficiently to engage the land 46 and seat 50, respectively, along the flat annular areas therebetween rather than along a line or small area of contact. Suitable annular grooves 64 and 66 are provided at locations on bolt 16 to accommodate the lips in their deformed position during assembly, as shown in FIGURE 1. The lips 42 and 44 are constructed and proportioned so that the deformation thereof in normal use is within the elastic limit of the material from which the body member is made. Accordingly, after assembly for operation as shown in FIGURE 1, the coupling may be disassembled for any reason whatever, and be reassembled for effective and satisfactory operation.

It is to be observed that in the invention described, the deformation of the lips within their elastic limits, together with rendering the body member re-usable, also effects a resilient sealing force against the surface of the bolt 16 and conduit 12 and further that the pressure of fluid within the coupling is effective to increase the sealing engagement of the lips against their sealing surfaces since the inner portions of these lips are exposed to such fluid. In the assembled condition, body member 14 and any member connected thereto at threads 43 may be pivoted with respect to the conduit 12 while fluid communication through the coupling is maintained.

Referring now to FIGURE 4 wherein is shown a modified form of coupling, 70 represents a fixed conduit having a bore 72 through which communication is established with a positionable member attachable to the end of an elbow 74 through the coupling represented generally at 76. The elbow 74 includes a pair of arms 78 and 80 joined at substantially a right angle and the arms are provided with, respectively, longitudinal bores 82 and 84 to establish a through channel in the elbow. Arm 78 may be threadedly secured to an angularly positionable member not shown by means at the threads 79.

For facilitating sealed attachment of the elbow to fixed conduit 70, a polygonal sided nut 86 having a hollow skirt 88, threaded exteriorly at 90 for engagement with the threads 92 in an enlarged portion of bore 72, is provided. The lower end of the skirt 88 is rounded at 93 and in assembled position abuts an annular shoulder 94 formed near the end of arm 80 of elbow 74. Insertion of nut 86 into bore 72 forces the end of skirt 88 against shoulder 94 driving the arm downwardly to bring its outer end portion 95 against the frusto-conical surface 96 of bore 72 to deform the end of the arm by uniformly constricting the same about its periphery a limited extent and to force the end of the skirt against another portion of frusto-conical surface 96 to uniformly constrict the end of the skirt about its periphery a limited extent. The ends of arm 80 and skirt 88 bear against surface 96 with such force and over sufficiently large annular areas as to tightly seal the coupling.

For further assuring a tight seal at the coupling 76, conduit 70 is provided with an annular seat 98 about the mouth of bore 72 for engagement with an annular lip 100 formed on nut 86 and protruding therefrom. Lip 100 is similar to lips 42 and 44 shown in FIGURES 1–3 in that it is provided with a relatively thick base and with swaged, convergent, frusto-conical walls terminating in a relatively thin outer end portion. The lip is undercut at 102 to allow a predetermined deformation of the lip to the position shown in FIGURE 4. The longitudinal spacing between the end of skirt 88 and lip 100 is established to effect a substantially simultaneous engagement between the skirt end and surface 96 on the one hand and the lip 100 and seat 98 on the other hand.

In the embodiment of FIGURE 4, the deformations of the lip 100, the end of skirt 88 and the end of arm 80 are within the respective elastic limits of the materials from which they are made whereby the elbow 74 may be repositioned or removed and reassembled merely by unthreading the nut 86 along its skirt portion 90 and subsequently tightening the same along these threads.

Referring now to FIGURE 5 of the drawings, 110 represents generally an entire coupling according to a modification of the invention for establishing sealed communication between a relatively fixed conduit 112 and an angularly positionable member (not shown). The coupling 110 includes an elbow 114 having an arm 116 to which the angularly positionable member may be secured by threads 117 and another arm 118 disposed at substantially a right angle relative to arm 116. The arms 116 and 118 are provided with bores 120 and 122, respectively, to establish communication through the elbow. Arm 118 and bore 122 are slightly flared as at 124, and terminate in a radial flange 126. For securing the arm 118 within the conduit 112, a nut 128 having a skirt portion 130 exteriorly threaded at 132, is provided for threaded engagement with the threads 134 along the interior of the conduit 112. The lower end of skirt 130 is slightly flared at 136 complementary to the flare 124 of arm 118, and the end of the skirt is shaped to conform to the radial flange 126 of the arm. Accordingly, the skirt 130 firmly engages the arm 118 at each end of the skirt, whereby when nut 128 is turned by a wrench or other suitable tool, the skirt 120 is threaded along the interior of the conduit 112 to force the arm 118 downwardly into the conduit 112. The engagement between the lower end of skirt 130 and the flange 126 and between the lower end of the skirt 130 and the flared portion 124 of arm 118 is tight to provide an effective fluid seal at this point.

According to this invention, further sealing engagement between the elbow 114 and the conduit 112 is effected by a pair of opposed annular lips 138 and 140 on opposite axial ends of nut 128. Each of the lips 138 and 140 is shaped to have a relatively broad base portion and opposed convergent, frusto-conical wall portions terminating in a relatively narrow annular outer edge. In a manner described with respect to the sealing lips in FIGURES 1–4, each of the lips 138 and 140 is undercut at 142 and 144, so as to enable deformation of the respective lips under the forces imposed by an annular seat 146 at the mouth of conduit 112 on the one end, and an annular seat 148 formed by an overhanging portion 150 of elbow 114. As the nut 128 is turned to thread the skirt portion 130 along the threaded portion 134, the lip 140 is directly forced into engagement with seat 146 and the skirt engages the arm, particularly along flange 126, to draw the overhanging portion 150 of the elbow and its seat 148 downwardly against the lip 138. Accordingly, each of the lips is deformed and brought into tight engagement with its co-operative sealing surface along an annular surface area effecting a tight seal thereat. In this embodiment of the invention, as well as that shown in the other figures of the drawings, the coupling may be disassembled after having been assembled for operation and reassembled for further use, or alternatively, the arm 116 of elbow 114 may be repositioned by loosening nut 128 and subsequently tightening the same down to firmly hold the elbow in position. This is accomplished by the proportioning of lips 138 and 140, so that in their deformation they are not bent beyond their elastic limits.

Referring now to FIGURES 6 and 7 of the drawings showing still another embodiment of the invention, 160 represents generally the entire coupling assembly for establishing communication between a relatively fixed conduit 162 having an interiorly threaded bore 164 and a positionable member (not shown). The coupling includes an elbow 166 having an arm 168 to which the positionable member may be attached by threads 169 and another arm 170 disposed at substantially a right angle with respect to each other, and a symmetrical collar 172. The end portion 174 of arm 170 is threaded for engagement with threads 164 of conduit 162, whereby the arm 170 may be threaded into and out of the conduit. An annular shoulder 176 is formed by an overhanging annular portion 178 on arm 170, and a frusto-conical seat 180 is formed at the mouth of conduit 162. In the assembled position of the coupling 160, collar 172 is disposed between shoulder 176 and seat 180 along a portion of arm 170 and a pair of opposed angular lips 182 and 184 of collar 172 are deformable into flat engagement with the shoulder 176 and seat 180, as shown in FIGURE 6 of the drawings. As shown in FIGURE 7 of the drawings, lips 182 and 184 initially assume the positions as shown therein, wherein the same protrude outwardly and are convergent. This shape of the lips is obtained by swaging the lips from the initial cylindrical form they assume. In assembling the coupling the collar is disposed about the arm 170 with the lip 182 in engagement with the shoulder 176, and the threaded portion of the arm is screwed into the conduit 162 until the lips 182 and 184 are deformed into surface contact with the shoulder 176 and seat 180 substantially as shown in FIGURE 6. In the assembled position of the coupling 160, the lips 182 and 184 are deformed only within the elastic limits, whereby the collar may be re-used after disassembly or the elbow arm 168 may be angularly repositioned.

Referring now to FIGURE 8 of the drawings, showing still another modification of the invention, 190 represents generally the entire coupling of this modification of the invention for establishing communication between a pair of axially aligned conduits or hoses (not shown) having attachment nut members 192 and 194 interiorly threaded at 196 and 198 for threaded engagement with the exteriorly threaded skirt portions 200 and 202 of a union nut member 204. The nut has a pair of opposed annular, frusto-conical lips 206 and 208, each having a relatively thick base portion and a pair of convergent frusto-conical wall portions terminating in a relatively thin outer end. The lips are undercut at 210 and 212 to enable deformation of the lips inwardly against respective frusto-conical seats 214 and 216. For achieving a more effective seal, the members 192 and 194 are provided with respective further frusto-conical seats 218 and 220 located within the bores and spaced from seats 214 and 216, for engagement by lips 222 and 224 formed at the end of the respective skirts 200 and 202. As shown in FIGURE 8, the nut member 194 is at an intermediate point of its assembly on the nut 204 wherein the lips 208 and 224 are beginning to contact respective seats 216 and 220. Nut member 192 is shown in its completely assembled position, wherein lips 206 and 222 have been deformed and brought into tight surface engagement with respective seats 214 and 218. As pointed out with respect to the embodiments of the invention, in FIGURES 1-7 of the drawings, the lips 206, 208, 222 and 224 in their assembled position are bent only within their elastic limits, whereby the coupling may be disassembled, after having been assembled, and re-used without the necessity of replacement of any of the elements.

As shown in FIGURE 9 of the drawings, the lips, as shown in FIGURES 4, 5 and 8 of the drawings, are undercut by a tool, as shown at 230, which is forced against the nut as the same is rotated as in a lathe, and thereafter the lip is swaged to a position, wherein both surfaces of the lip are of frusto-conical contour.

In that form of the invention shown in FIG. 10, the fitting 240 is secured to a body 241 by means of member 242 which is provided with an internal bore 243 having a transverse opening 244 which places the inner bore 243 in communication with the annular chamber 245 so that fluid entering the inclined passage 246 of the fitting is led downwardly into the body 241. In this form of the invention the fitting 240 is provided with integrally formed sealing lips 247 and 248 at the upper and lower faces of the fitting 240. The body portion 241 is similarly chamfered to receive the lower sealing lip 248 and the fastening member 242 is undercut at the underside of the head to receive the upper sealing lip 247. The shank portion of the member 242 is threaded as at 249 and when the member 242 is drawn up onto the body 241, the sealing lips 247 and 248 are stressed toward each other within the elastic limit of the metal of which the fitting 240 is made and thus the parts are maintained in fluid-tight engagement.

Having thus described this invention in such full, clear, concise and exact terms as to enable any person skilled in the art to which it pertains to make and use the same, and having set forth the best mode contemplated of carrying out this invention, I state that the subject-matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A fluid coupling comprising a body section having an axial bore therein, an end face on said body section normal to the bore, a threaded opening extending from said bore towards said end face, a first outwardly flaring conical seat portion extending from the end of said bore to said threaded opening, said body section having a second outwardly flaring conical seat at the end face thereof opening into said threaded opening, a nut member adapted to be received in said body portion, said nut comprising a maximum diameter portion overhanging said second conical seat of the body, said nut having a thin flexible tapered lip portion integrally formed thereon and extending axially and radially inwardly from the nut to be received in the said second conical seat, said nut having a cylindrical threaded portion extending axially into the threaded opening in said body, said cylindrical threaded portion terminating in a tapered end adapted to be engaged by said first conical seat at the juncture between the body bore and the threaded opening whereby said nut may be drawn into said body member and said flexible lip will form a seal with the second conical seat and the end of the threaded portion of the nut is deformed inwardly by the first conical seat.

2. A fluid coupling comprising a pair of adjacent body sections adapted to be coupled by a nut member, each of said body sections having an axial bore, each of said body sections having a threaded opening therein adjacent an end face of the body section, an outwardly flaring conical seat formed in the body section extending from the end face thereof to said threaded opening within the body, said threaded opening within the body having a greater diameter than the bore in the body and a flared conical portion joining the bore in the body and said threaded opening, said nut member having a maximum diameter portion intermediate its ends and oppositely extending exteriorly threaded cylindrical skirt portions adapted to be received within the threaded portions of the body members, said nut member having an axial bore therethrough to establish communication between the two body members through said nut member, the outer free end of each of said cylindrical skirt portions on the nut adapted to bear against the flared conical portion joining the body bore and the threaded opening in the body, said nut having integrally formed flexible lip portions extending axially and inwardly from said maximum diameter portion, said lip portions tapering toward the free ends and proportioned to be received within the conical seats at the end face of each of the body portions whereby a fluid-tight seal is formed by said lips as the nut member is drawn into the body sections.

References Cited in the file of this patent

UNITED STATES PATENTS

| | | |
|---|---|---|
| 951,704 | Schmidt | Mar. 8, 1910 |
| 1,805,666 | Hukill | May 19, 1931 |
| 2,239,942 | Stone et al. | Apr. 29, 1941 |
| 2,258,066 | Oyen | Oct. 7, 1941 |
| 2,441,363 | Krueger | May 11, 1948 |
| 2,454,557 | Jacobson | Nov. 23, 1948 |
| 2,503,826 | Lamont | Apr. 11, 1950 |
| 2,746,486 | Gratzmuller | May 22, 1956 |
| 2,852,281 | Ellis | Sept. 16, 1958 |
| 2,863,678 | Gordon | Dec. 9, 1958 |
| 2,898,000 | Hanny | Aug. 4, 1959 |
| 3,003,795 | Lyon | Oct. 10, 1961 |

OTHER REFERENCES

Applied Hydraulics, vol. 9, No. 1, page 77, January 1956. "Connect up with L and L".